B. GARLLUS.
NETTING LOOM.
APPLICATION FILED SEPT. 9, 1915.

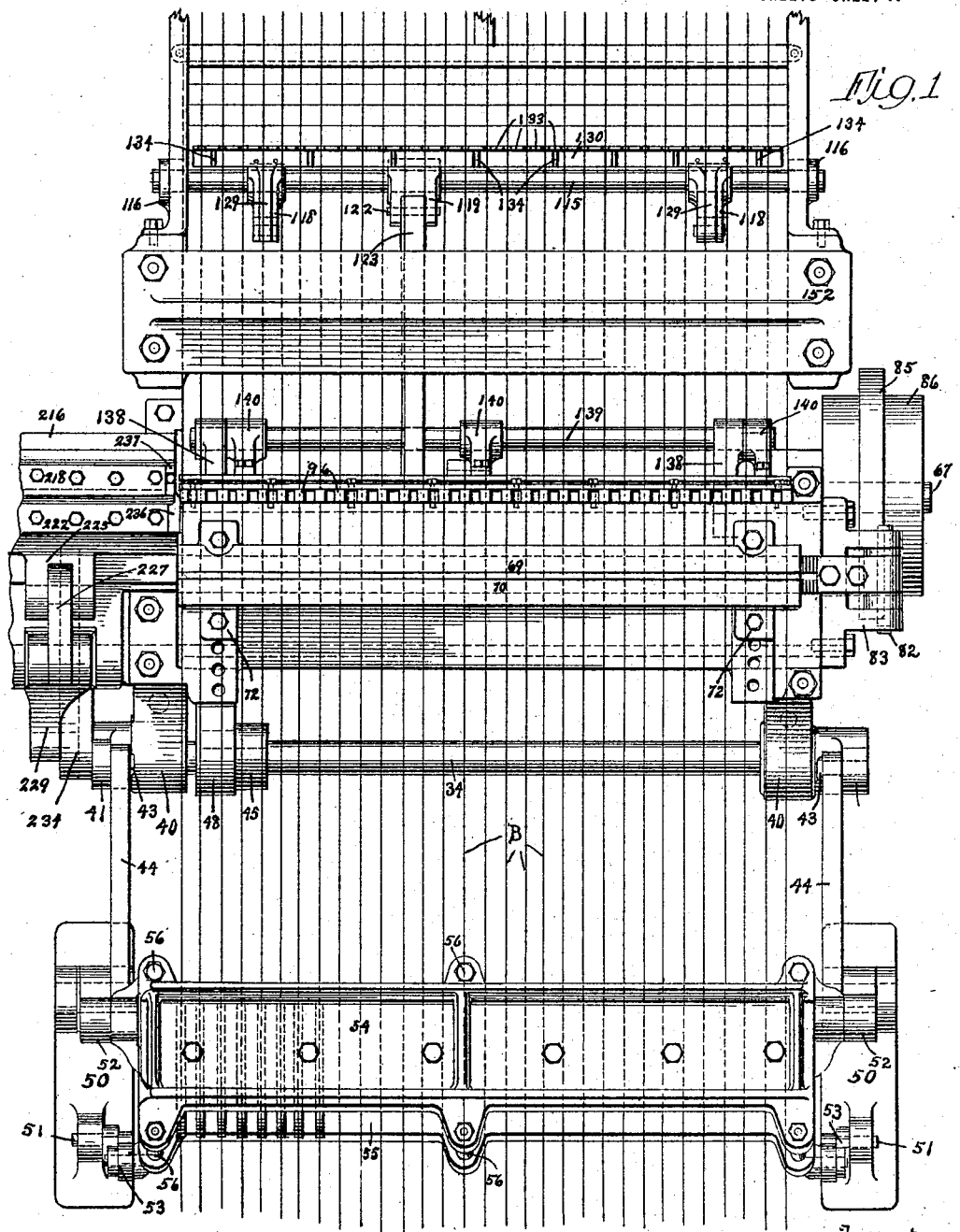

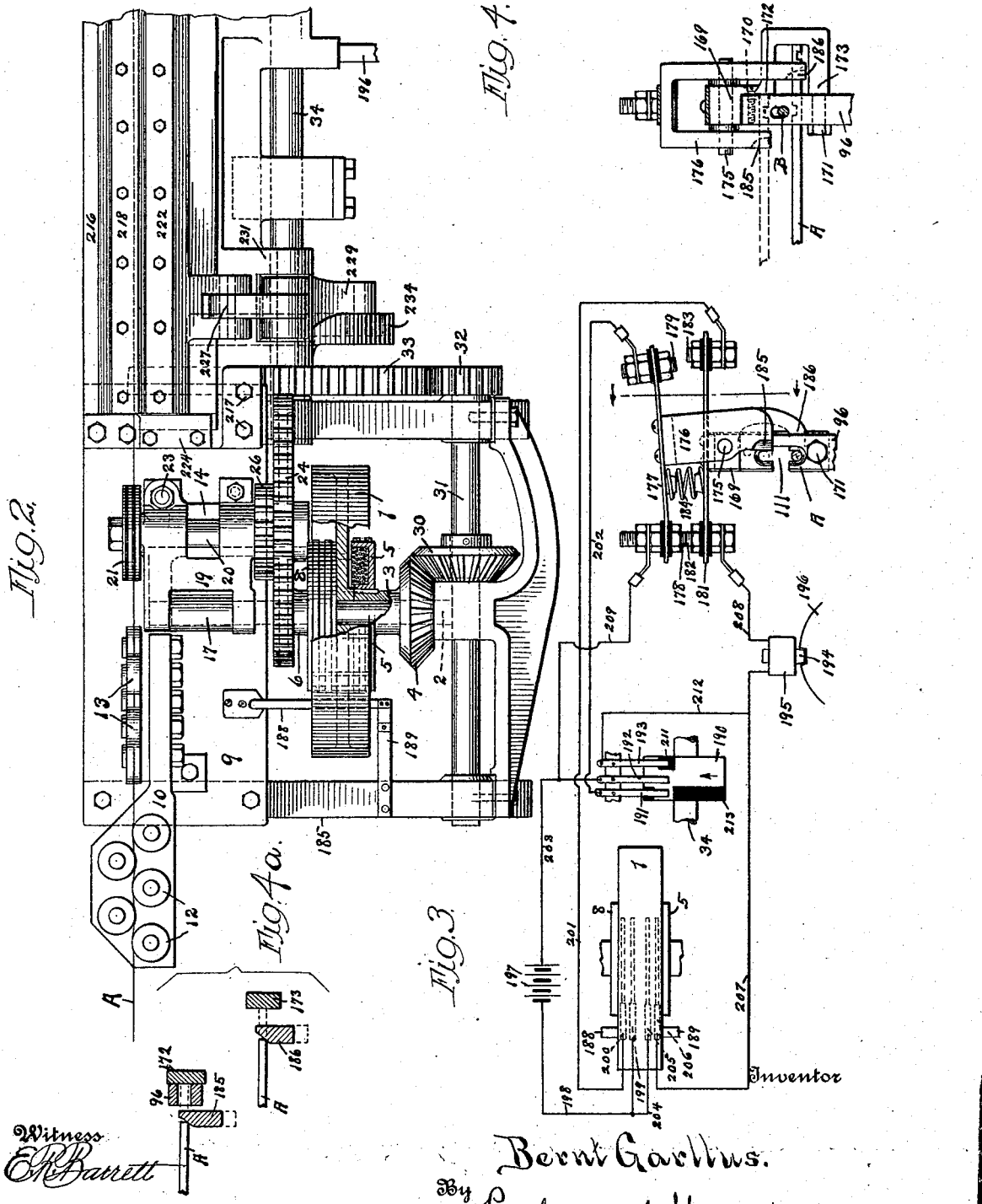

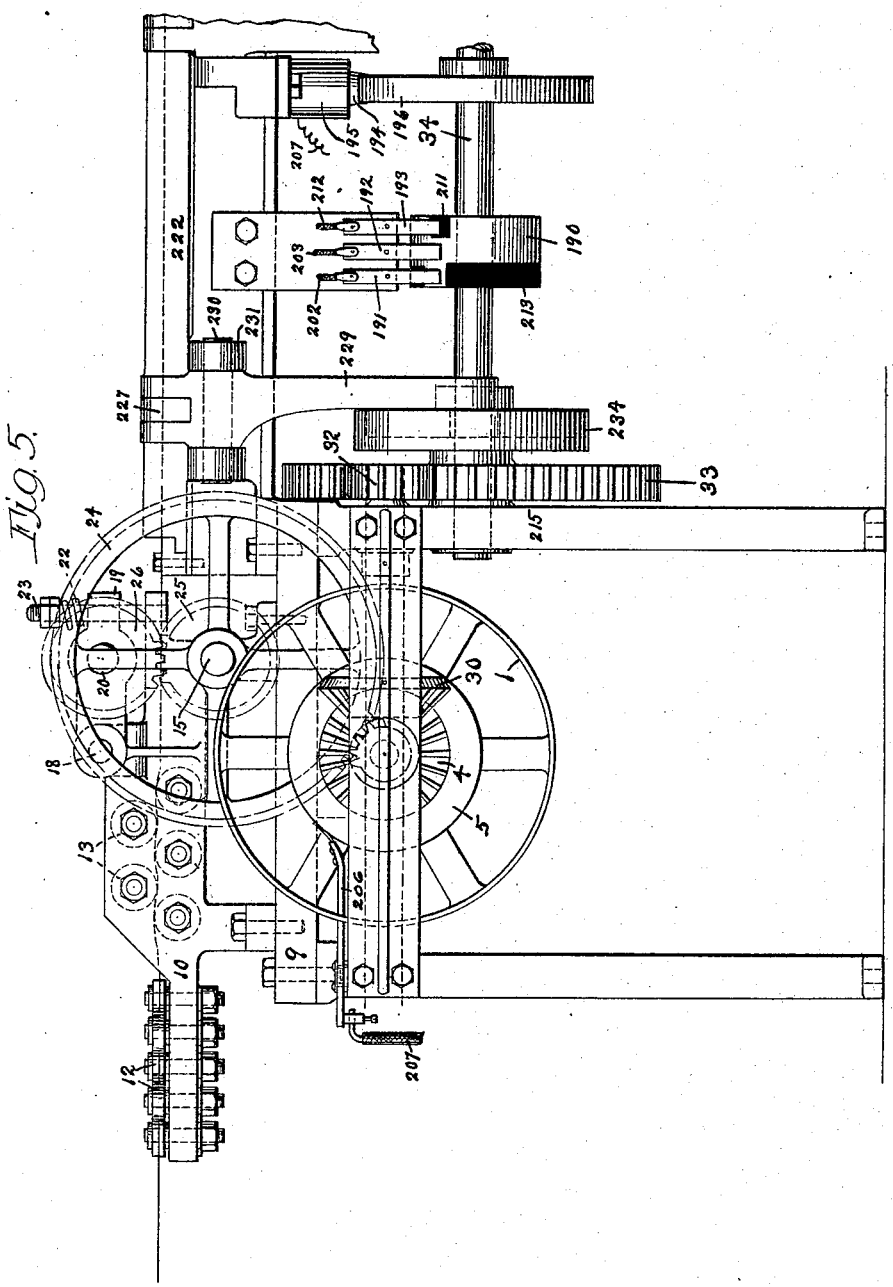

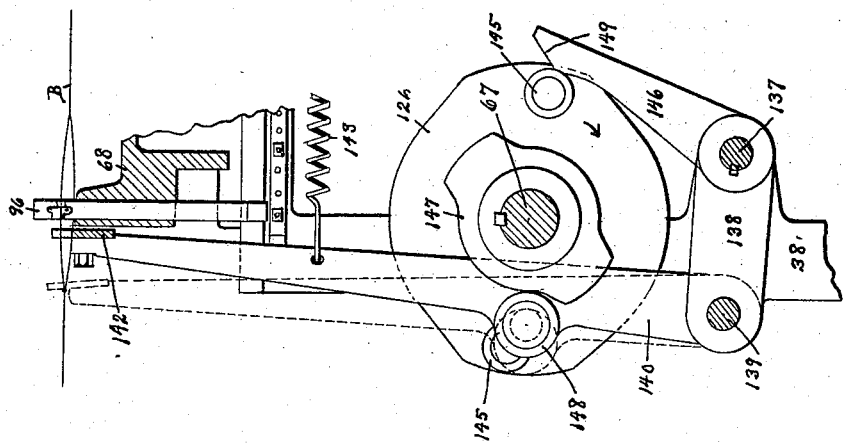
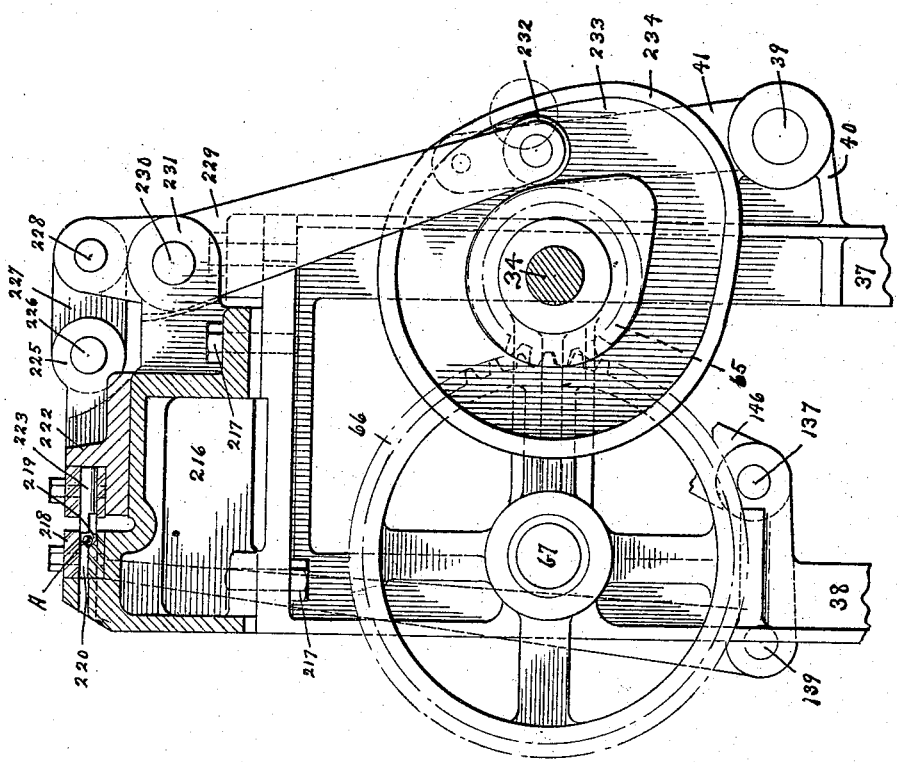

1,187,138.  Patented June 13, 1916.
9 SHEETS—SHEET 6.

Witness
E. R. Barrett

Inventor
Bernt Garllus.
By Pagelsen and Spencer
Attorneys

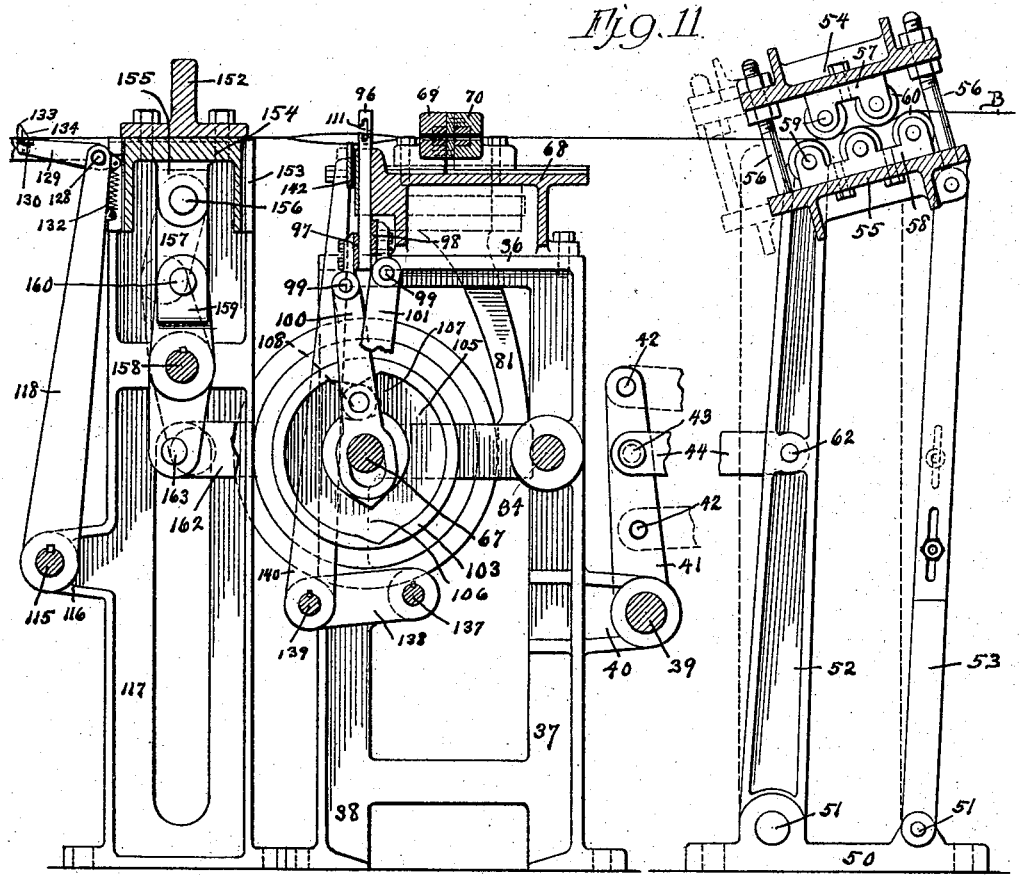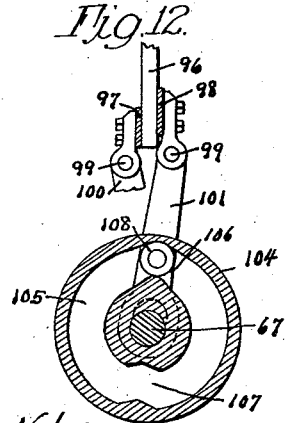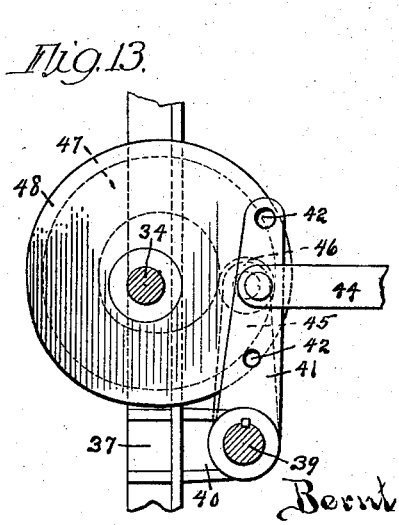

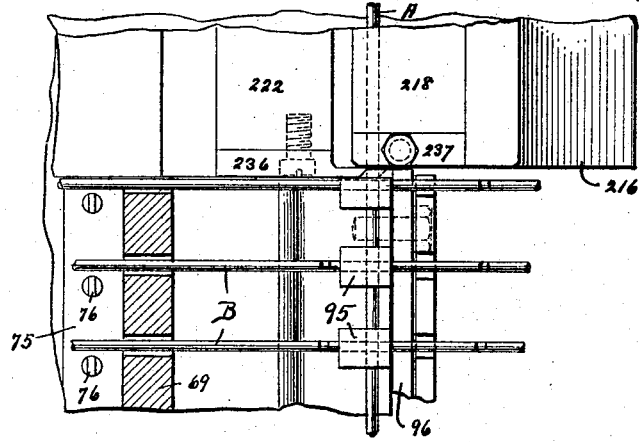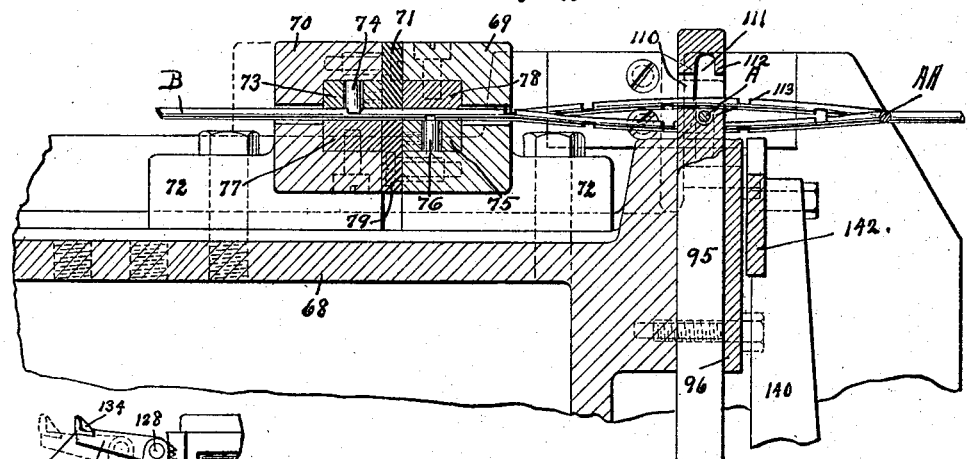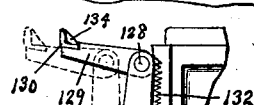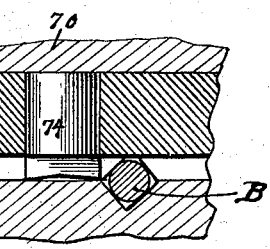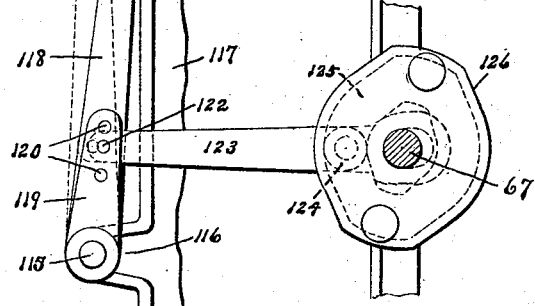

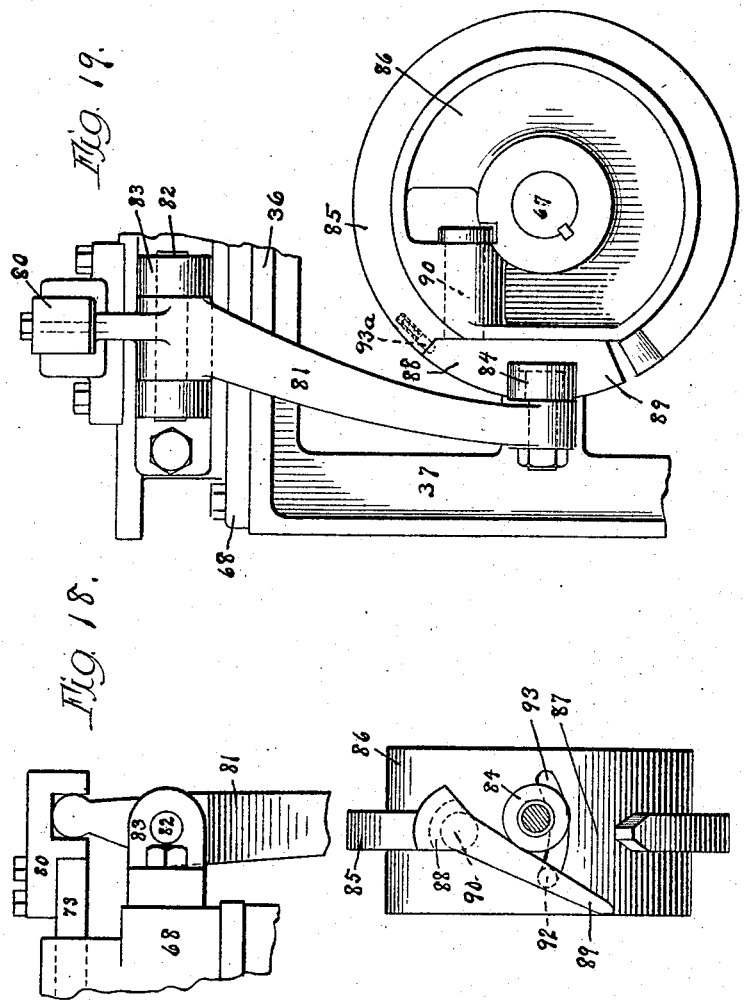

UNITED STATES PATENT OFFICE.

BERNT GARLLUS, OF DETROIT, MICHIGAN, ASSIGNOR TO N. E. S. MANUFACTURING COMPANY, OF DETROIT, MICHIGAN, A CORPORATION OF MICHIGAN.

NETTING-LOOM.

1,187,138. Specification of Letters Patent. Patented June 13, 1916.

Application filed September 9, 1915. Serial No. 49,732.

*To all whom it may concern:*

Be it known that I, BERNT GARLLUS, a citizen of the United States, residing at Detroit, in the county of Wayne and State of Michigan, have invented a new and useful Netting-Loom, of which the following is a specification.

This invention relates to machines for weaving fabrics from stiff rods or bars that must be fed longitudinally into the machine as distinguished from wires which can be rolled onto shuttles, and its object is to provide a loom of this character which can handle rods of large size, which shall have a large output, and which can easily be adjusted to change the mesh and dimensions of the fabric.

This invention consists, in combination with means for intermittently feeding continuous strands or warp rods through the machine, of cutters for notching alternately the top and bottom sides of these warp rods, means for feeding the transverse or woof rods into the machine, novel means for notching alternately the top and bottom sides of the woof rods, and novel means for alternately raising and depressing the warp rods to permit the insertion of the woof wires.

It further consists in stopping mechanism for the woof rods which will operate to so limit the movements of these rods that when woven into the fabric, each alternate rod will project beyond the others a distance substantially equal to the lateral distance between the warp rods.

It further consists in novel means for feeding the finished fabric and for positioning the woof rods so that they may enter the notches in the warp rods while at the same time the warp rods are received in the notches in the woof rods. It further consists in the details of construction illustrated in the accompanying drawings and particularly pointed out in the claims.

Figure 6:
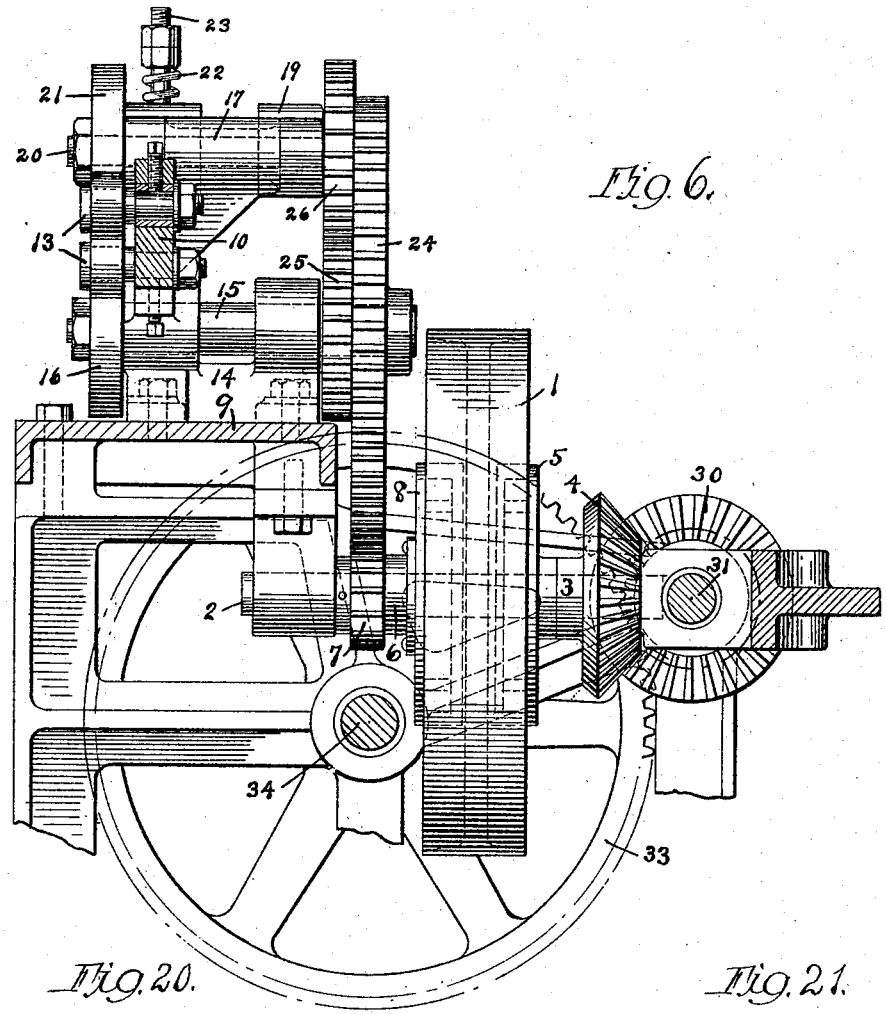
Figures 20, 21:
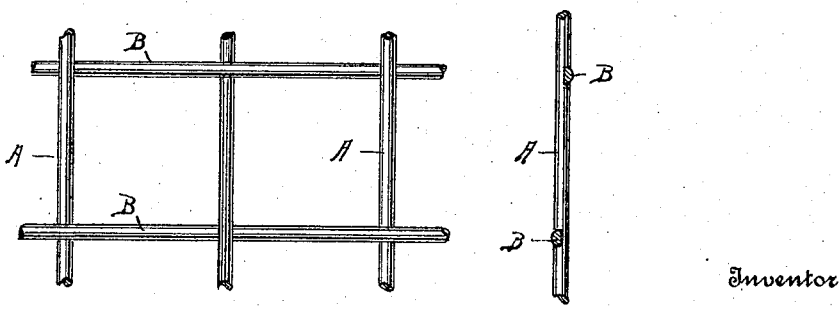
Figure 9:
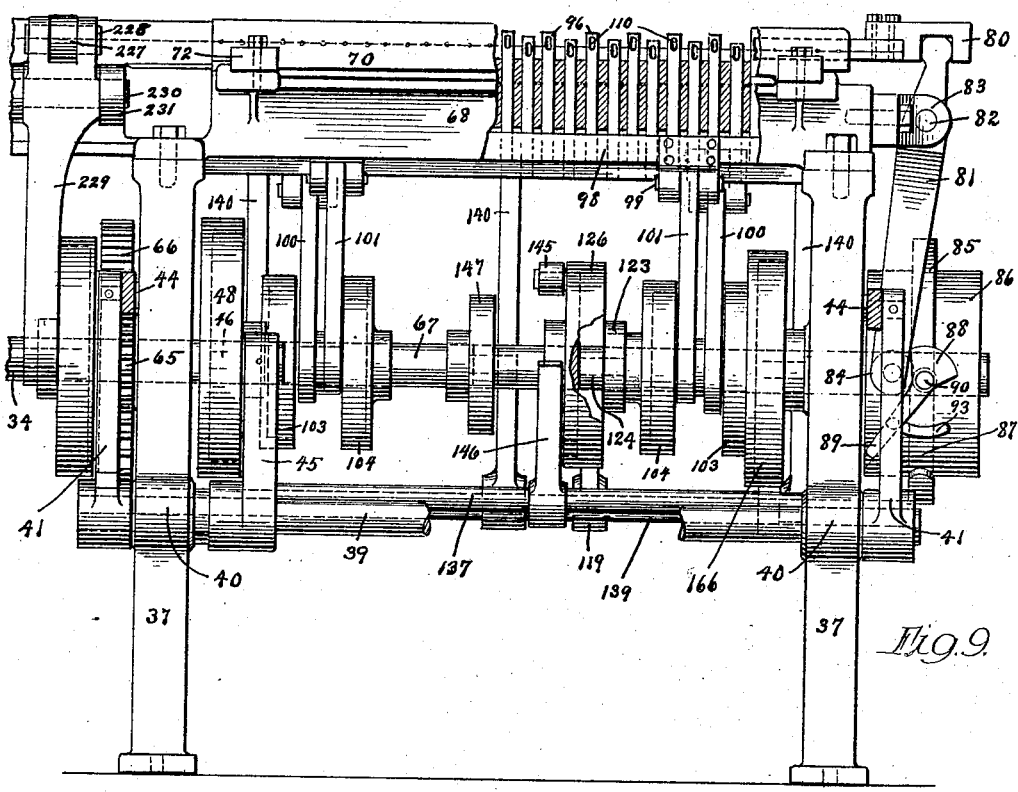
Figure 10:
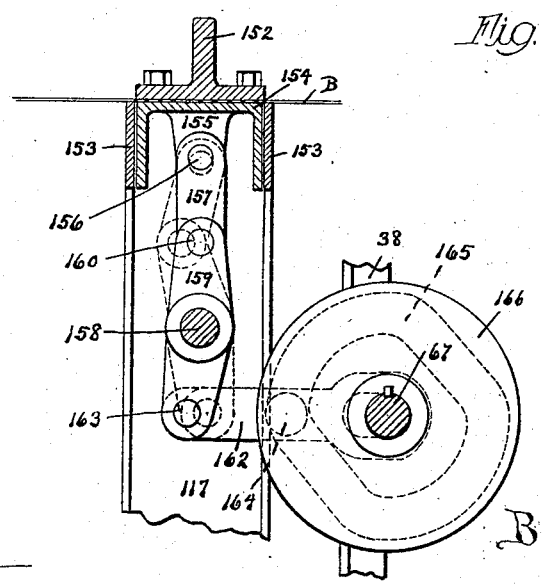

In the accompanying drawings, Figure 1 is a plan of the main portion of the loom viewed from the front end and Fig. 2 is a plan of the feeding and notching mechanism for the woof or transverse rods. Fig. 3 is a diagrammatic view of the wiring for the electro-magnetic clutches. Fig. 4 is a front elevation of the stop mechanism for the transverse bars of the fabric. Fig. 4ᵃ is a vertical section thereof through the center of the transverse bars. Fig. 5 is a front elevation of the device shown in Fig. 2. Fig. 6 is a left end view thereof with the straighteners removed. Fig. 7 is a vertical transverse section of the notching device for the transverse rods. Fig. 8 is a detail of the positioning mechanism for the transverse rods after they have been fed in between the strands. Fig. 9 is a front elevation of the cam shaft. Fig. 10 is a detail of the pressing mechanism for forcing the rods constituting the fabric into proper position and also straightening them if bent. Fig. 11 is a longitudinal vertical section of the main frame, presser and straighteners. Fig. 12 is a detail of one of the separator cams. Fig. 13 is a detail of the cam for swinging the straightener rolls for the strand rods. Fig. 14 is a longitudinal vertical section of the loom through the separating and notching mechanism taken from the right in Fig. 1. Fig. 15 is a plan of a portion of this mechanism. Fig. 16 is an elevation of the fabric feeding device taken from the left in Fig. 1. Fig. 17 is a view of a notching cutter for the strands. Figs. 18 and 19 are details on a larger scale of the mechanism for actuating these cutters. Figs. 20 and 21 are views of portions of the finished fabric.

Similar reference characters refer to like parts throughout the several views.

In my former application, filed June 12, 1915, Serial Number 33,647, a loom is shown for weaving netting by feeding notched rods diagonally from both sides across the machine to constitute the fabric, which, when completed, consists of two sets of diagonal rods, preferably crossing each other at right angles. The fabric produced by the present machine consists of warp or strand rods extending the entire length of the fabric and parallel to the longitudinal edges thereof, and the transverse or woof rods that extend across the fabric. Each of the warp and woof rods is notched alternately on the top and bottom sides to receive the rods that cross it. The continuous strands or warp rods are fed intermittently through the machine, being straightened and notched as they pass along. The material for the transverse rods is notched for the full width of the fabric at one operation and then fed in across the strands, after which it is sheared, the fabric advancing one space after the transverse rod has been sheared.

Referring to Figs. 2, 5 and 6 which illustrate the mechanism particularly pertaining to the transverse or woof rods, a main pulley 1 is revolubly mounted on a stationary shaft 2. On this shaft are mounted the sleeve 3 to which the bevel gear 4 and the clutch member 5 are connected, and the sleeve 6 which carries the pinion 7 and the clutch member 8. The clutches are preferably of the electro-magnetic type and their construction and wiring will be explained later on. The clutch member 8 and pinion 7 actuate the feeding rolls of the transverse rods A while the clutch member 5 and bevel gear 4 actuate all the remainder of the mechanism. Any other desired mechanism may be interposed between the driving member and the two groups of mechanism.

Mounted on the table 9 is a bracket 10 which carries the vertical straightening rolls 12 and the horizontal straightening rolls 13 for the transverse rods A. A bracket 14 carries bearings for the shaft 15 of the lower feed roll 16, and which bracket also has an extension 17 carrying a pivot pin 18 for the frame 19 that carries the shaft 20 for the upper feed roll 21. This upper feed roll is normally held down by means of a spring 22 on the bolt 23 carried by the bracket 14. The spur pinion 7 meshes with a gear 24 on the lower shaft 15, which shaft also carries the gear 25 that meshes with a similar gear 26 on the upper shaft. Whenever therefore, the clutch member 8 is connected to the pulley 1, the rod A is drawn through its straighteners and fed into the loom.

The bevel pinion 4 meshes with a bevel pinion 30 mounted on the shaft 31 which carries the pinion 32 that meshes with the gear 33 on the main shaft 34. This shaft 34 actuates all of the different parts of the loom (with the exception of the straightening and feeding mechanism for the transverse rods), and each revolution of this shaft constitutes a cycle of the machine.

The loom proper is built up of three frames which may be termed the straightening frame at the front end, the presser frame at the rear end, and the weaving frame between them. The weaving frame 36 is supported by pairs of legs 37 and 38 and the shaft 34 is mounted in these legs 37. See Fig. 11.

On the ends of the shaft 39, carried in bearings 40 on the legs 37, are crank arms 41 having any desired number of holes 42 to receive the pins 43 on the rear ends of the links 44. On this shaft is also mounted a crank arm 45 (Figs. 9 and 13) that carries a roller 46 at its upper end. This roller extends into the eccentric groove 47 in the cam 48 on the shaft 34. At each revolution of this main shaft, the crank arms 40 are swung forward and back and with them the links 44.

The straightening frame consists of the bases 50 carrying the pivots 51 on which the legs 52 and 53 are pivotally mounted. Plates 54 and 55 are connected by bolts 56, and are mounted on the top of these legs. Each plate carries a series of brackets 57 and 58 across which the shafts 59 extend, and on these shafts the straightening rollers 60 are mounted, one set for each strand B. The links 44 connect to the pins 62 carried by the legs 52. The movement of the straightening frame will have the longitudinal length of the meshes of the woven fabric. By moving the pins 43 up or down, the movement of the straightening frame can be increased or decreased. The legs 53 are preferably made adjustable to control the action of the straightening rolls.

The shaft 34 carries a pinion 65 that meshes with the gear 66 on the cam shaft 67, which shaft carries cams that actuate the notching device for the strands, the separators, the means for positioning the transverse rods, the means for pressing the transverse wires into place, and the feeding mechanism.

On the legs 37 and 38 is mounted a table 68 (Fig. 11) which carries two transverse guides 69 and 70 (Fig. 14), each secured to the table by means of bolts passing through the feet 72, the feet of the guide 70 being adjustable longitudinally of the machine. These guides are perforated to permit the passage of the strands B as indicated in Fig. 4. A bar 73, slidable in the guide 70, carries a series of cutters 74, one for each strand, to cut notches in the upper side thereof, while the slidable bar 75 carries the cutters 76 to form the notches in the lower sides of the strands. Die bars 77 and 78 are mounted below and above the slidable bars 73 and 75 respectively. As the top and bottom of each strand is notched simultaneously, the rod has no tendency to turn. These cutters are moved back and forth across the strands, cutting notches at each stroke, the cutters being double-edged so that they will notch at each stroke, being held in position by the plates 71 and 79. The slidable bars are connected at one end to a knuckle 80 mounted on the upper end of a lever 81. See Figs. 1, 9, 18 and 19. This lever is pivoted on a pin 82 carried by a bracket 83 on the table 68 and its lower end carries a roller 84 that is adapted to engage the flange 85 on the wheel 86 on the cam shaft 67. This flange has a gap 87, and above the gap is pivoted the switch lever 88 having an arm 89. As the wheel turns, the roller 84 strikes the arm 89 and the lower end of the lever is swung across through the gap 87. As it passes up, it strikes the upper end of the switch and turns it, swinging the arm into the opposite direction, so that the next time the roller reaches the switch it will be forced across through the gap in the opposite direction. Thus at each revolution of the wheel, the lever is swung to the right or to the left, carrying the cutters across the strands and cutting two notches at each stroke. The cutters make one stroke for each two revolutions of the main shaft, and the strands are fed twice between the strokes of the cutters. This switch is mounted on a pin 90 and on a flattened part of the wheel 86. The movement of the arm is limited by a pin 92 extending into a slot 93 and restrained by a friction pin 93a.

After the warp rods or strands are notched, it is necessary for alternate strands to be raised and depressed alternately in order to permit the transverse or woof rods to be fed in by means of the mechanism first described. To accomplish this, the rear edge of the table 68 is grooved vertically to receive the vertically movable spreaders 96 that are held in slidable position by means of the plate 96. These bars are alternately secured to the plates 97 and 98 shown in Figs. 11 and 12 which carry pins 99 that connect to the cam rods 100 and 101. On the shaft 67 are the pairs of cams 103 and 104, one pair for each end of the plates 97 and 98. These cams are similar in construction and positioned with their high and low points diametrically opposite each other. In each cam, the groove 105 is concentric throughout most of its length, being interrupted by the diametrically opposite high point 106 and low point 107. The rollers 108 on the rods 100 and 101 in riding in these grooves will be moved up and down, thereby moving up or down the group of spreaders to which they are connected. The lower ends of these cam rods are preferably guided on the shaft 67.

As shown in Fig. 9, the spreaders are formed with holes 110 to permit the passage of the strands. As shown in Fig. 14, they are also formed with transverse openings 111 that connect with these holes, the upper lips 112 and lower lips 113 extending to the outer lines of these holes 110. If therefore a spreader is pushed up, the lip 113 will engage the rod B, and the lower part of the opening 111 will constitute a guide for the transverse rod A. Similarly, when the spreader is moved down, the upper part of this opening will constitute a guide for the rod B as it is fed across above the depressed rods A. The shaft 67 is given one half revolution between rests, and the rests occur with one half of the spreaders up and the other half down. At the next rest, the positions are reversed. During these rests the transverse rods A are fed in between the elevated and depressed strands.

After the rod A has been fed in and cut off, the shaft 67 turns one half revolution, and during substantially all of this movement, the spreaders are in intermediate position with the lips 112 and 113 equal distances above and below the rods A so that the fabric can be moved the length of one mesh and the rod A carried laterally out of the openings in the spreaders. The feeding of the fabric is performed by mechanism illustrated in Figs. 9, 11 and 16.

A shaft 115 is mounted in bearings 116 on the legs 117 of the presser frame and on this shaft are secured the long crank arms 118 and the short crank arm 119, the latter having holes 120 (Fig. 16) to receive the pin 122 on which the rear end of the rod 123 is mounted. The front end of this rod is supported by the shaft 67, and the rod carries a roller 124 that engages in the double cam groove 125 in the cam 126 on the shaft 67. At the upper ends of these arms 118 are pins 128, on which are mounted the arms 129 extending from the cross bar 130. This cross bar is normally held up by means of the springs 132, shown in Fig. 16, so that it will always bear against the bottom of the fabric. The cross bar 130 is notched to permit the resultant fingers 133 to project up between the strands into the plane of the transverse rods. Small inclines 134 on the forward sides of these fingers cause them to lower to pass under these transverse rods when the cross bar is moved forward. At each revolution of the main shaft, and at each half revolution of the cam shaft 67, this feeding mechanism will move the fabric the length of one mesh, and with it the rod A that has just been fed into the machine. After the rod A has thus been moved laterally out of the notches 111 in the spreaders, it is moved laterally some distance farther, or to the position AA in Fig. 14, in order that the strands can be separated for the next transverse rod, which would be substantially impossible if the next preceding rod A were permitted to remain close up to the line of feed. Near the ends of the shaft 137 journaled on the legs 38 are mounted two crank arms 138, which carry the shaft 139 on which are secured the upright arms 140 that carry the notched plate 142, normally just below the fabric and just back of the spreaders. A spring 143 normally holds the upper ends of these arms and the plate 142 forward. On the shaft 67 is the cam 126 having two laterally extending rollers 145 adapted to contact with the arm 146 on the shaft 137. On this shaft is also a double cam 147, adapted to engage the roller 148 on one of the arms 140. The end 149 of the arm 146 is beveled.

As the shaft 67 turns, the cam 126 will turn from the position shown in Fig. 16 through about seventy-five degrees, during which time the fabric will be fed forward one mesh. At the end of the rearward movement of this feeding mechanism, the roller 145 will have engaged the incline 149 on the arm 146 and raised the plate 142 to the position shown in Fig. 8. Immediately thereafter, the cam 147 will engage the roller 148 and swing back the plate 142 to the position shown in dotted lines. These two movements of the plates 130 and 142 will move the transverse rod from the position A in Fig. 14 to the position AA, a distance of about two and one half times the length of a mesh. During this positioning of the transverse rod the strands are being notched and the straightener frame is swinging forward, this frame swinging back when the fabric is fed by the plate 130. While this frame is swinging forward, the fabric must be held, and a presser is provided for such purpose as well as for forcing the members of the fabric into each other's notches.

Extending across the top of the legs 117, Fig. 10, is a cross bar 152, and these legs are also provided with guides 153 which are lowered sufficiently to permit the fabric to pass above them. A channel-shaped presser plate 154 is slidable between these guides and has depending lugs 155 that carry pins 156 to which toggle links 157 connect. These links connect to toggle levers 159 mounted on a shaft 158 by means of pins 160, and a cam rod 162 connects to the lower end of one of the levers by means of a pin 163. The opposite end of this cam rod is supported by the shaft 67, and the rod carries a roller 164 that engages in the groove 165 in the cam 166. It will therefore be seen that the presser plate 154 will be held upwardly to grip the fabric during substantially one half of the cycle of the machine, that is, during the time the positioning plate 142 is being actuated and the transverse rod fed in.

During the time the fabric is being fed by means of the plate 130, and the transverse rod just fed in is positioned by the plate 142, and the spreaders are separating the strands, the feed rollers for the rod A are at rest. During the time the main loom is at rest, the rod A is fed in and immediately after it has reached its position, its feed rolls stop and the main shaft begins to revolve.

The electric circuits that control these operations are as follows: The width of the fabric will be determined by the number of the strands B. The strands will always be omitted at the right side of the machine, and the device shown in Fig. 4 may be attached to the last spreader 96 to the right. The bracket 169 is secured to the spreader by means of screws 170 and 171 and consists of a portion 172 in the path of the rod A when the spreader is down and a second portion 173 which permits the rod A to be fed in the width of one mesh farther when the spreader is raised. The adjacent spreader to the right must be removed. In this manner the succeeding rods A present notches to the last rod B alternately from opposite sides. This bracket carries a pin 175 on which is mounted a yoke 176 that carries a flat resilient member 177 bearing insulated contacts 178 and 179. A second flat resilient member 181 is secured to the bracket 169 and carries insulated contacts 182 and 183. A spring 184 normally holds the contacts 179 and 183 in engagement. The yoke 176 has two depending ears 185 and 186, each provided with inclines so that when either is engaged by the rod A, the lower part of the yoke will be swung over to carry the contacts 178 and 179 into engagement. As soon as the rod A is moved out of the slot 111, the spring 184 returns the contact 179 into engagement.

Projecting from the frame 185 that carries the shaft 2 are two brackets 188 and 189 and each carries two contact brushes that bear on insulated contact rings on the clutch members 5 and 8, which rings connect to the windings of the electro-magnetic clutches. On the shaft 34 is a drum having an insulated shell 190 with which the brushes 191, 192 and 193 engage. On this shaft may also be mounted a stop disk 196 having a notch to receive the armature 194 of a solenoid 195. The operation of this device is then as follows.

When the rod A is fed in it strikes one of the inclined members 185 or 186 and swings the yoke 176, causing the contacts 179 and 183 to separate and the contacts 178 and 181 to engage. This breaks the circuit from the battery 197, line 198, brush 199, winding of clutch 8, brush 200, line 201, contacts 183—179, line 202, brush 191, drum 190, brush 192, and wire 203 to the battery, and the clutch being deënergized, the feed rolls of the rod A stop at once. At the same time the spring 184 swings the contacts 178 and 182 in engagement, completing the following circuit: from the battery 197 over the lines 198 and 204, brush 205 to the windings of the clutch 5, brush 206, line 207, windings of solenoid 195, line 208, contacts 182—178, and lines 209 and 203 to the battery. This causes the armature 194 to be lifted and the disk 196 to be released, and immediately the clutch 5 causes the pulley 1 to turn the bevel gears 4 and 30 and the main shaft 34. As soon as the insulation 211 passes from under the brush 193, the current will no longer pass through the solenoid but will pass over the line 212 to the brush 193, shell 190, brush 192 and line 203 to the battery, the armature 194 dropping onto the periphery of the disk 196 and being in readiness to stop the shaft 34 at the end of one revolution. The rod A will also be fed with the fabric from contact with the yoke 176, and the spring 184 permitted to swing the contacts 179 and 183 into engagement. As soon as the insulation 211 again reaches the brush 193, the current to the clutch 5 will be cut off, and at the same time the insulation 213 will have passed from under the brush 191 so that the circuit to the clutch 8 will again be closed.

After the rod A has been fed in across the strands and the feed rollers therefor have stopped, and the shaft 34 has begun to revolve, the first work of this main shaft is to shear the rod A and at the same time notch another length thereof. Extending from the legs 37 and 38 that support the weaving table, to the legs 215 that support the table 9, is a heavy bed 216, held in position by means of the bolts 217. On this bed is secured a die bar 218 having a longitudinal groove 219 to receive the rod A, as shown in Fig. 7, and transverse holes 220 to permit the chips to escape. Slidable on the bed is a bar 222 which carries cutters 223, alternately over and under-cut so that they may notch the upper and lower side of this rod A alternately. The ends of this bar 222 are slidable under the plates 224. To this bar are connected the ears 225 which carry pins 226 that extend through the ends of the links 227, the opposite ends of which are carried by pins 228 in the upper ends of the levers 229 mounted on the pins 230 carried by lugs 231 on the bed 216. The lower ends of these levers carry rollers 232 that engage in the cam grooves 233 in the cams 234 mounted on the main shaft 34. The slidable member 222 also carries the movable shear member 236 which co-acts with the stationary member 237 to cut the rods A when they have been fed in across the strands.

It will be understood that the transverse rods A may be fed alternately across from both sides of the machine, which will avoid the unevenness of one edge of the fabric.

The operation of the machine is as follows: At the beginning, the front ends of the continuous strands are passed through between the rollers 60, through the guides 69—70, through the spreaders 96 and between the pressers 152 and 154. The rods must usually be fed by hand until cross rods A reach the feeder fingers 133, and that portion of these strands extending beyond the cross rods will be cut off. The shaft 67 makes one half turn for each cross rod or mesh of the fabric, and the cycle is divided about as follows. The shaft 67 is at rest during the time the cross rods are being fed in. During the first ten degrees of the cycle, the spreaders are moved to neutral or central position. During the next thirty degrees, the fabric is fed one mesh and the presser bar 154 is being moved upward, gripping the fabric about five degrees after it has come to rest. The forward movement of the straighteners begins as soon as the presser has engaged the fabric and continues during about seventy degrees of the movement of the shaft 67, during which time the strands are notched and the notched plate 142 rises and moves the rod A last fed in to the position AA in Fig. 14. During the notching, the plate 142 and the fingers 133 return to normal position. During the remainder of the cycle the straighteners begin to swing rearwardly and the spreaders separate the strands to admit a new rod A. At the beginning of the cycle, the cams 234 actuate the notching cutters for the transverse rods A and at the same time cut off the rod just fed in. As the rods A are notched by cutters that do not move laterally, the notches in the rods will always be in the same positions, when the forward ends of the rods are considered. That is, the notch next the forward end will always be either in the top or bottom side of each rod. But the notches in succeeding cross rods must alternate top and bottom along the outer strand, so that a changeable stop of the character shown in Fig. 4 is necessary, unless the notching mechanism is to be moved back or forth the width of one mesh after each feed to provide for this change in notching, or unless two notching and feeding devices are employed, one on each side of the machine, and each feeding in alternate rods. Such a construction would be useful only when the fabrics produced by a machine were of constant width.

The details and proportions of the various parts of this machine may all be changed by those skilled in the art without departing from the spirit of my invention.

I claim:

1. In a netting loom, the combination of a frame, means for intermittently feeding continuous strand rods over said frame, means for feeding transverse rods at intervals across the strand rods, means for notching alternately the top and bottom sides of the transverse rods, and independent means for notching alternately the top and bottom sides of the strands.

2. In a netting loom, the combination of a frame, means for intermittently feeding continuous strand rods over said frame, means for feeding transverse rods at intervals across the strand rods, means for notching alternately the top and bottom sides of the transverse rods, independent means for notching alternately the top and bottom sides of the strands, and means to move said strand-notching mechanism across the strands after each two operations of the strand-feeding means.

3. In a netting loom, the combination of a frame, means for intermittently feeding continuous strand rods over said frame, means for feeding transverse rods at intervals across the strand rods, means for notching alternately the top and bottom sides of the transverse rods, independent means for notching alternately the top and bottom sides of the strands, and means to move said strand-notching mechanism across the strands after each two operations of the strand-feeding means, said strand-notching means operating in both directions of movement.

4. In a netting loom, the combination of means for intermittently feeding continuous strands longitudinally through the loom, means for raising and depressing alternate strands alternately, means for feeding transverse rods across between the strands, cutters for notching alternately the top and bottom sides of the transverse rods, and independently operated cutters for notching alternately the top and bottom sides of the strands.

5. In a netting loom, the combination of means for intermittently feeding continuous strands longitudinally through the loom, means for raising and depressing alternate strands alternately, means for feeding transverse rods across between the strands, cutters for notching alternately the top and bottom sides of the transverse rods, independently operated cutters for notching alternately the top and bottom sides of the strands, and means to force the strand-notching cutters across the strands after each two operations of the strand-feeding means.

6. In a netting loom, the combination of means for intermittently feeding continuous strands longitudinally through the loom, means for raising and depressing alternate strands alternately, means for feeding transverse rods across between the strands, cutters for notching alternately the top and bottom sides of the transverse rods, independently operated cutters for notching alternately the top and bottom sides of the strands, said strand-notching cutters being double-edged to cut in both directions of movement, and means to force the strand-notching cutters across the strands after each two operations of the strand feeding means.

7. In a netting loom, the combination of means for intermittently feeding continuous strand rods parallel to each other through the loom in substantially the same plane, means for feeding transverse rods at intervals across the strand rods, means for cutting notches in the top and bottom sides of the transverse rods, and a pair of cutters for each strand rod to cut a notch in the top and in the top and in the bottom side of each strand rod at each actuation of said cutters.

8. In a netting loom, the combination of means for intermittently feeding continuous strand rods parallel to each other through the loom in substantially the same plane, means for feeding transverse rods at intervals across the strand rods, means for cutting notches in the top and bottom sides of the transverse rods, a pair of cutters for each strand rod to cut a notch in the top and in the bottom side of each strand rod at each actuation of said cutters, and means to move said strand rod cutters back and forth during each four actuations of the strand rod feeding means.

9. In a netting loom, the combination of means for intermittently feeding continuous strand rods parallel to each other through the loom in substantially the same plane, means for raising and depressing alternate rods alternately, means for feeding transverse rods across between the strands, means for notching the tops and bottoms of the transverse rods alternately, cutter carriers mounted above and below said strands, a notching cutter for each strand mounted in each carrier, and means to move said carriers back and forth during each four actuations of the strand rod feeding means.

10. In a netting loom, the combination of means for intermittently feeding continuous strands longitudinally through the loom, means for raising and depressing alternate strands alternately, a cutter mounted above and below each strand and adapted to cut notches in the top and bottom sides respectively of said strands, means to actuate said cutters after each two operations of the strand feeding means, means for feeding transverse rods between the raised and depressed strands, two series of cutters for notching alternately the top and bottom sides of the transverse rods, means to shear said rods, and means for varying the distance said rods are fed across the strands so that the length of alternate rods will vary the distance between strands.

11. In a netting loom, the combination of a frame, means for intermittently feeding continuous strand rods over said frame, means for feeding transverse rods at intervals across the strand rods, means for notching alternately the top and bottom sides of the transverse rods, independent means for notching alternately the top and bottom sides of the strands, means to move said strand-notching mechanism across the strands after each two operations of the strand feeding means, and means for sliding said transverse rods longitudinally of the strand rods.

12. In a netting loom, the combination of means for intermittently feeding continuous strands longitudinally through the loom, means for raising and depressing alternate strands alternately, a cutter mounted above and below each strand and adapted to cut notches in the top and bottom sides respectively of said strands, means to actuate said cutters after each two operations of the strand feeding means, means for feeding transverse rods between the raised and depressed strands, two series of cutters for notching alternately the top and bottom sides of the transverse rods, means to shear said rods, means for varying the distance said rods are fed across the strands so that the length of alternate rods will vary the distance between strands, and means for sliding said transverse rods longitudinally of the strands until they enter the notches in said strands.

13. In a netting loom, the combination of means for intermittently feeding continuous strands longitudinally through the loom, means for raising and depressing alternate strands alternately, a cutter mounted above and below each strand and adapted to cut notches in the top and bottom sides respectively of said strands, means to actuate said cutters after each two operations of the strand feeding means, means for feeding transverse rods between the raised and depressed strands, two series of cutters for notching alternately the top and bottom sides of the transverse rods, means to shear said rods, means for varying the distance said rods are fed across the strands so that the length of alternate rods will vary the distance between strands, means for sliding said transverse rods longitudinally of the strands until they enter the notches in said strands, and means to force the strands and rods into each other's notches.

14. In a netting loom, the combination of means for intermittently feeding continuous strands longitudinally through the loom, means for raising and depressing alternate strands alternately, a cutter mounted above and below each strand and adapted to cut notches in the top and bottom sides respectively of said strands, means to actuate said cutters after each two operations of the strand feeding means, means for feeding transverse rods between the raised and depressed strands, two series of cutters for notching alternately the top and bottom sides of the transverse rods, means to shear said rods, means for varying the distance said rods are fed across the strands so that the length of alternate rods will vary the distance between strands, means for sliding said transverse rods longitudinally of the strands until they enter the notches in said strands, pressing means for forcing the strands and rods into each other's notches, and means to cause the pressing means to grip the the fabric during the feeding operation of the transverse rods.

15. In a netting loom, the combination of means for intermittently feeding continuous strands longitudinally through the loom, a pair of transversely slidable carriers, a cutter for each strand mounted in said carrier, the cutters in one carrier projecting down to cut notches in the tops of the strands and in the other carrier projecting up to cut notches in the bottoms of the strands, the distance between the lines of the cutters equaling the length of a mesh, means to raise and depress alternate strands alternately, means for feeding transverse rods across between the strands, means to shear the transverse rods, and means to feed the finished fabric longitudinally after the insertion of each transverse rod, said fabric feeding means operating twice between successive operations of the strand notching mechanism.

16. In a netting loom, the combination of means for intermittently feeding continuous strands longitudinally through the loom, a pair of transversely slidable carriers, a cutter for each strand mounted in each carrier, the cutters of one carrier projecting down to cut notches in the tops of the strands and in the other carrier projecting up to cut notches in the bottoms of the strands, the distance between the lines of cutters equaling the length of a mesh, means to raise and depress alternate strands alternately, means for feeding transverse rods across between the strands, means to feed the finished fabric longitudinally after the insertion of each transverse rod, and means for moving the last inserted transverse rod laterally in the direction of the travel of the fabric.

17. In a netting loom, the combination of means for intermittently feeding continuous strands parallel to each other through the loom in substantially the same plane, means for raising and depressing alternate rods alternately, means for cutting transverse notches in the top and bottom sides of transverse rod material, the notches in the top and bottom sides thereof alternating and spaced the same distance as the strands, means to feed said rod material between the raised and depressed strands, means to stop the transverse rods so that alternate rods will extend the distance between strands beyond the others, and means to cut off the transverse rods.

18. In a netting loom, the combination of means for intermittently feeding continuous strands parallel to each other through the loom in substantially the same plane, means for raising and depressing alternate rods alternately, means for cutting transverse notches in the top and bottom sides of transverse rod material, the notches in the top and bottom sides thereof alternating and spaced the same distance as the strands, means to feed said rod material between the raised and depressed strands, means to stop the transverse rods so that alternate rods will extend the distance between strands beyond the others, said means being mounted on one of the raising and depressing devices for the strands, and means to cut off the transverse rods.

19. In a netting loom, the combination of means for intermittently feeding continuous strands parallel to each other through the loom in substantially the same plane, means for raising and depressing alternate rods alternately, means for cutting transverse notches in the top and bottom sides of transverse rod material, the notches in the top and bottom sides thereof alternating and spaced the same distance as the strands, means to feed said rod material between the raised and depressed strands, means to stop the transverse rods so that alternate rods will extend the distance between strands beyond the others, driving mechanism for said feeding device, a second driving mechanism for the remainder of the movable parts of the loom, and electro-magnetic clutches to operate the driving mechanisms in sequence.

20. In a netting loom, the combination of means for intermittently feeding continuous strands parallel to each other through the loom in substantially the same plane, means for raising and depressing alternate rods alternately, means for cutting transverse notches in the top and bottom sides of transverse rod material, the notches in the top and bottom sides thereof alternating and spaced the same distance as the strands, means to feed said rod material between the raised and depressed strands, means to stop the transverse rods so that alternate rods will extend the distance between strands beyond the others, driving mechanism for said feeding device, a second driving mechanism for the remainder of the movable parts of the loom, electro-magnetic clutches to operate the driving mechanisms in sequence, and means actuated by the transverse rod as it reaches its final position to control the operation of said clutches.

21. In a netting loom, the combination of a frame, means for intermittently feeding continuous strands over said frame, means for feeding transverse rods at intervals across the strand wires, an electro-magnetic clutch for operating each of said feeding means, a switch to control said clutch mounted in the path of said transverse rods and controlled thereby, means for notching the strands, and means for notching the rods so that they may interengage with the strands.

22. In a netting loom, the combination of means for feeding continuous strands longitudinally through the loom, means for feeding transverse rods at intervals across the strands, and means for notching alternately the top and bottom sides of the transverse rods.

23. In a netting loom, the combination of means for feeding continuous strands longitudinally through the loom, means for feeding transverse rods at intervals across the strands, and means for notching alternately the top and bottom sides of the strands.

In testimony whereof I sign this specification.

BERNT GARLLUS.

Copies of this patent may be obtained for five cents each, by addressing the "Commissioner of Patents, Washington, D. C."